C. A. MOBERG.
HEADLIGHT CONTROLLING DEVICE.
APPLICATION FILED OCT. 27, 1910.
991,346.
Patented May 2, 1911.
6 SHEETS—SHEET 1.
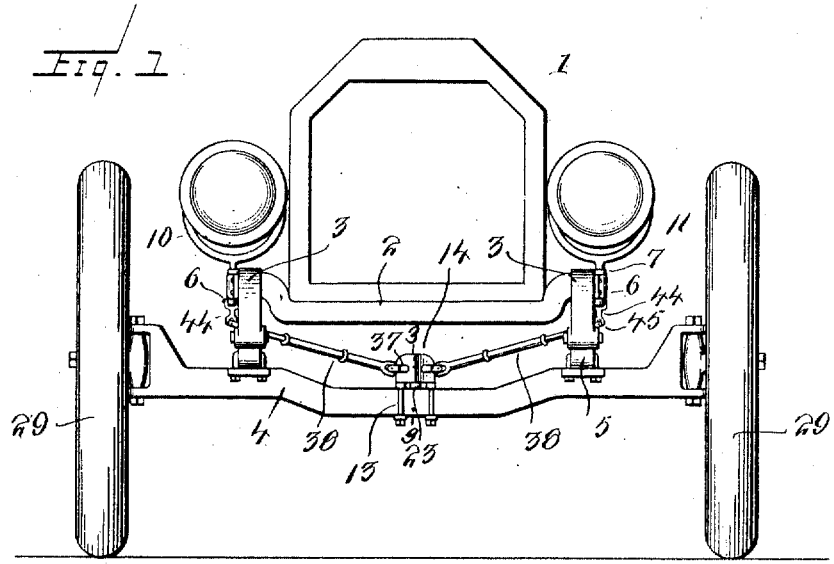
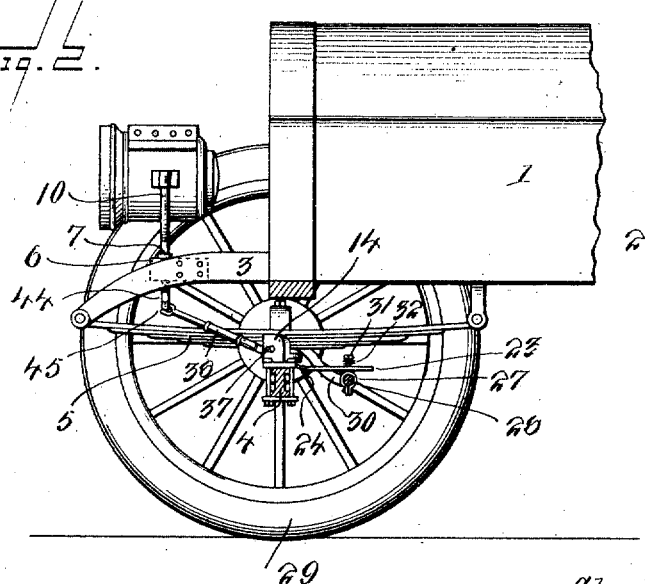
Inventor
Charles A. Moberg
By Victor J. Evans
Attorney
Witnesses
E. P. Ruppert
P. Edmonston Jr.

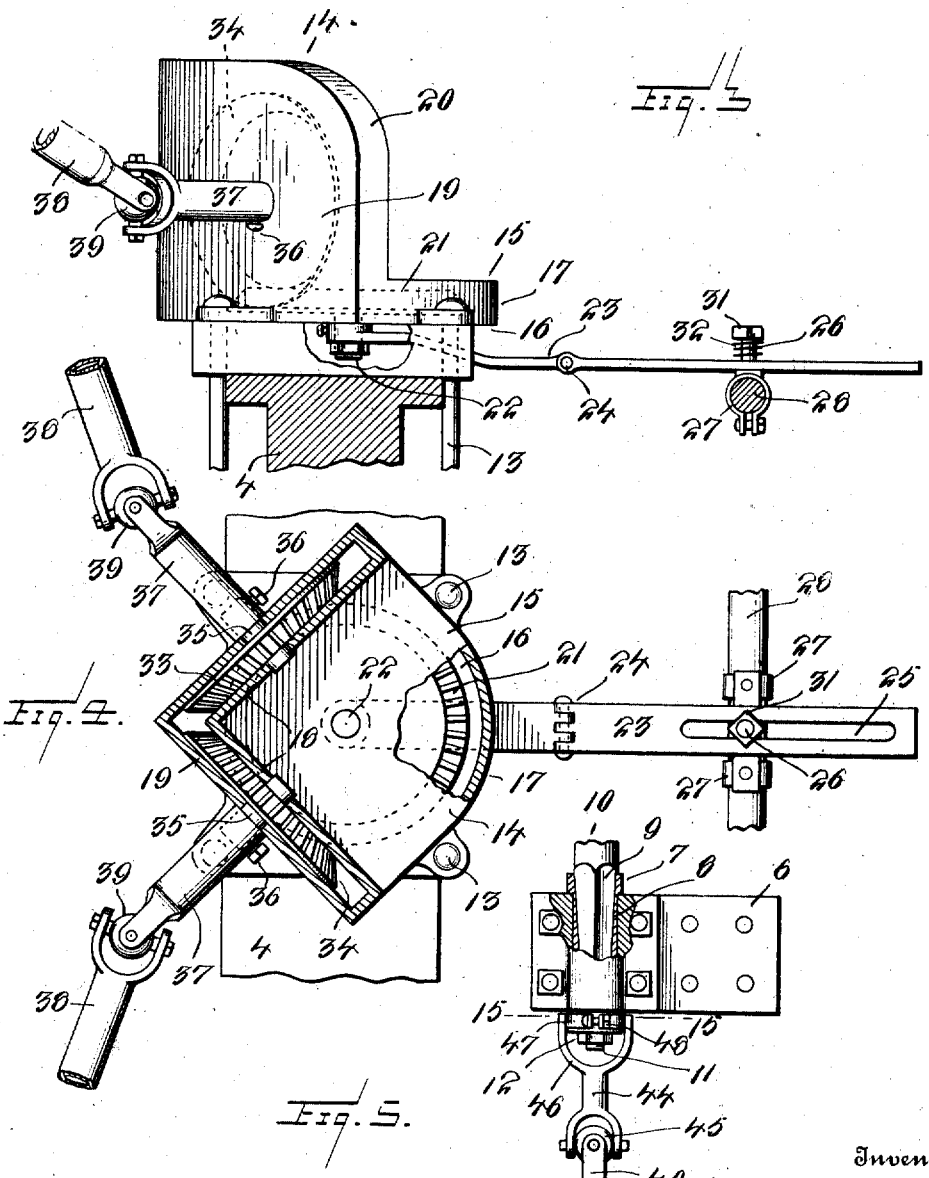

C. A. MOBERG.
HEADLIGHT CONTROLLING DEVICE.
APPLICATION FILED OCT. 27, 1910.
991,346.
Patented May 2, 1911.
6 SHEETS—SHEET 3.
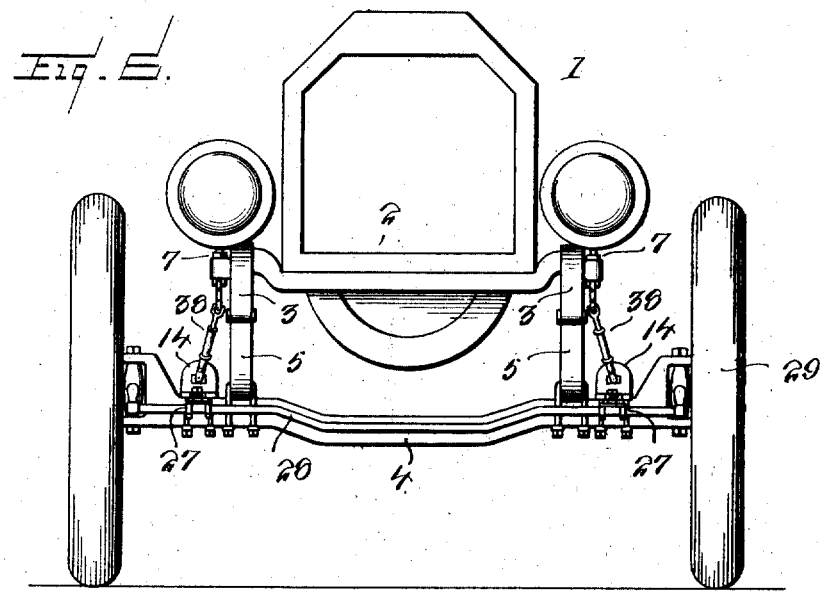
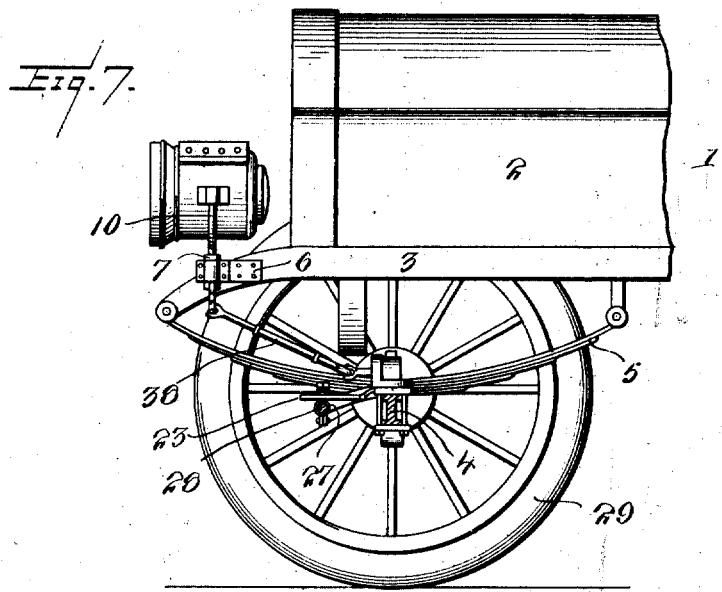
Inventor
Charles A. Moberg
Witnesses
By Victor J. Evans
Attorney

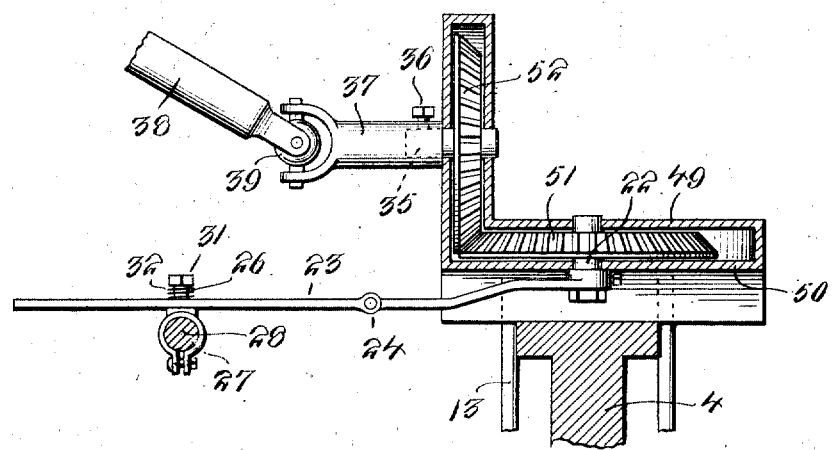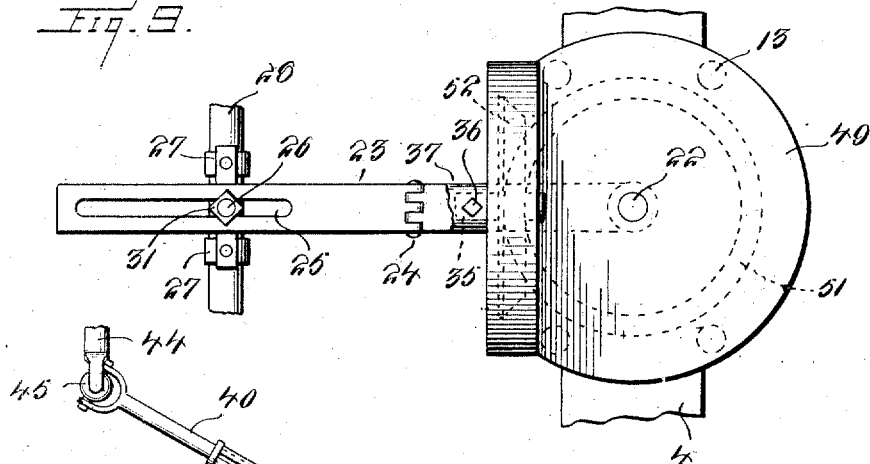

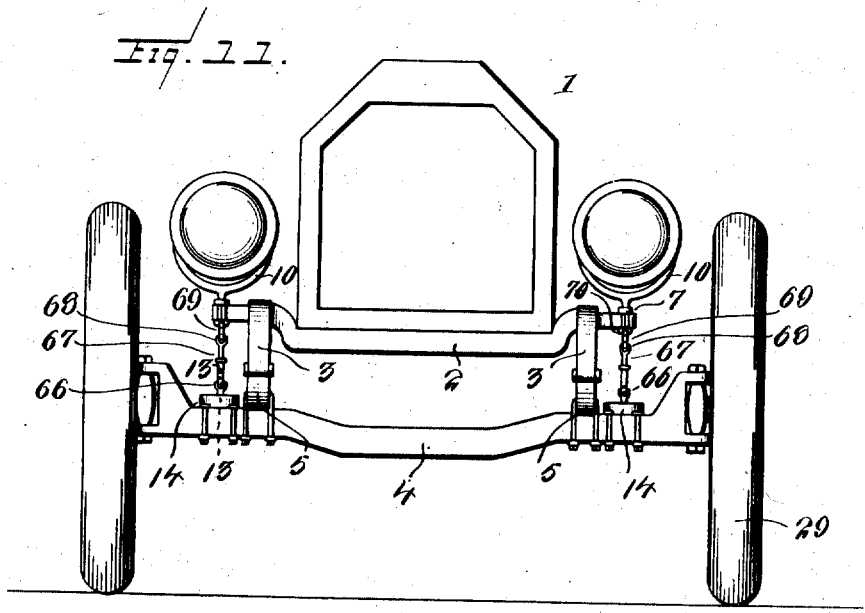
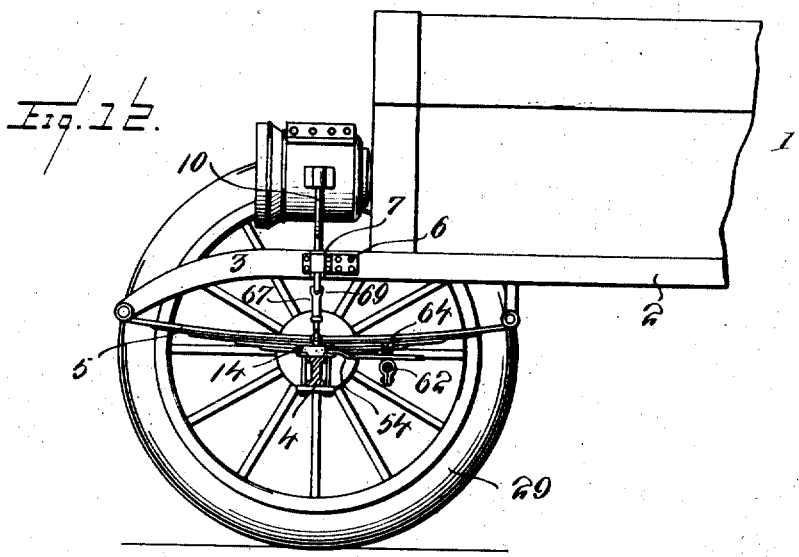

C. A. MOBERG.
HEADLIGHT CONTROLLING DEVICE.
APPLICATION FILED OCT. 27, 1910.

991,346.

Patented May 2, 1911
6 SHEETS—SHEET 6.

Witnesses
E. R. Ruppert
Chedmonston

Inventor
Charles A. Moberg
By Victor J. Evans
Attorney

UNITED STATES PATENT OFFICE.

CHARLES A. MOBERG, OF NEW CASTLE, NEW HAMPSHIRE.

HEADLIGHT-CONTROLLING DEVICE.

991,346.  Specification of Letters Patent.  Patented May 2, 1911.

Application filed October 27, 1910. Serial No. 589,366.

*To all whom it may concern:*

Be it known that I, CHARLES A. MOBERG, a citizen of the United States, residing at New Castle, in the county of Rockingham and State of New Hampshire, have invented new and useful Improvements in Headlight-Controlling Devices, of which the following is a specification.

This invention relates to means for controlling the movements of headlights for vehicles of all characters and the object of the invention is to provide means whereby the rays of the headlight may be thrown in a direction to cover the path over which the vehicle, vessel or other conveyance has to travel.

Heretofore, devices have been constructed whereby the headlight was held in a position parallel with or in line with the steering wheels of the vehicle. It is obvious that when a vehicle is traveling around a curve, the wheels assume a position at a tangent to the curve and the light is therefore thrown at a tangent to the curve. This in a way, produces better results than where the lights are carried by the body of the vehicle and their light rays thrown in a line therewith, but it does not avoid the difficulty of having the greater portion of the curve around which the vehicle is traveling uncovered by the light.

It is the object of this invention to move the lights simultaneously with the wheels in the same direction and at a greater angle so that not only the portion of the road being traveled over is covered by the light, but the portion to be traveled over.

Figure 13:
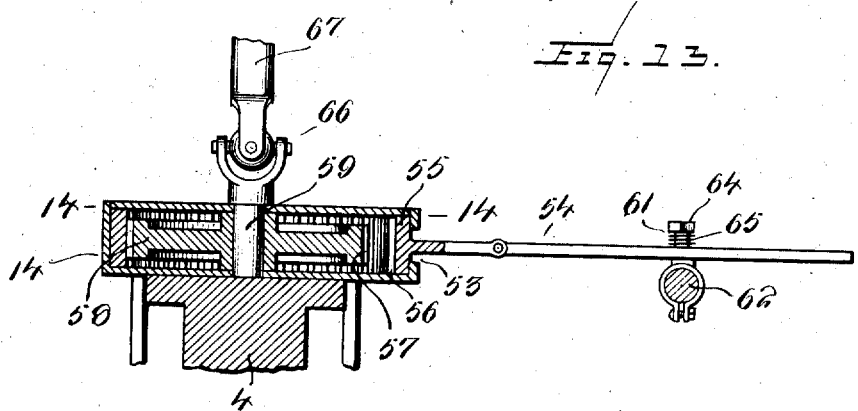
Figure 14:
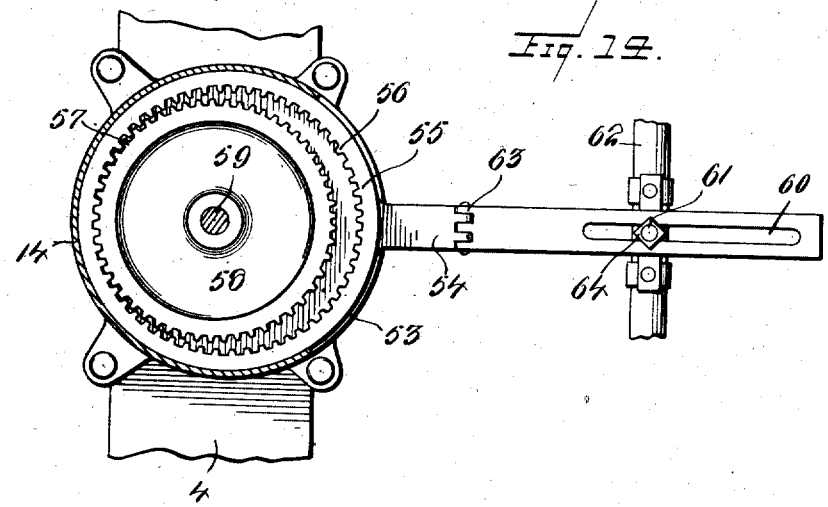
Figure 15:
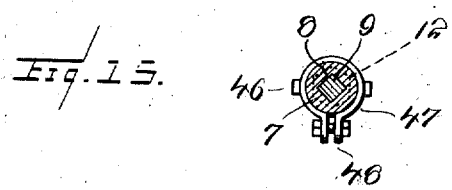

Further objects of the invention will appear as the following specific description is read in connection with the accompanying drawing which forms a part of this application, and in which:

Figure 1 is a front elevation of an automobile showing my invention applied thereto. Fig. 2 is a detail side elevation partly in section. Fig. 3 is an enlarged detail sectional view on the line 3—3 of Fig. 1. Fig. 4 is a horizontal plan view partly in section taken immediately above the axle of the machine. Fig. 5 is a detail elevation partly in section of the lamp mounting. Fig. 6 is a front elevation of a modified form. Fig. 7 is a detail side elevation partly in section thereof. Fig. 8 is a detail side elevation partly in section of the forms shown in Figs. 6 and 7. Fig. 9 is a detail top plan view of the parts shown in Fig. 8. Fig. 10 is a detail elevation of the transmitting shaft. Fig. 11 is a front elevation showing a modified form wherein the lamps are arranged directly over the axle of the vehicle. Fig. 12 is a detailed side elevation partly in section of the structure shown in Fig. 11. Fig. 13 is a vertical sectional view taken on the line 13—13 of Fig. 11. Fig. 14 is a horizontal section taken on the line 14—14 of Fig. 13. Fig. 15 is a horizontal section taken on the line 15—15 of Fig. 5.

In the specific embodiment of the invention illustrated herein an automobile 1 has been shown which is provided with the usual chassis 2 having the projecting side bars 3 which are connected to the axle 4 by the elliptic or semi-elliptic springs 5. Mounted upon the side bars 3 are lamp supporting brackets or plates 6 in which are journaled lamp sockets 7 having a squared and tapered internal bore 8 which is adapted to receive the squared and tapered shank 9 of the lamp staff 10. The lower end of this staff is preferably reduced and threaded as at 11 to receive a clamping nut 12 which holds the shank in position.

Secured upon the top of the axle by the bolts 13 is a casing 14 which is composed of a pair of horizontal plates 15 and 16 connected together at their rear ends by a side plate 17. The forward end of the casing is provided with a V-shaped inner plate 18 and a similarly shaped outer plate 19 which are connected together upon their top by a top plate 20, thus forming a dust-proof casing. Journaled between the plates 15 and 16 is a gear 21 which is provided with a depending stud 22 which projects through the plate 16 and has keyed thereto an operating arm 23 which is hinged in the middle as at 24 and at its rear end is provided with an elongated slot 25 adapted to receive an upstanding pin 26 carried by a clamp 27 which is secured to the connecting rod 28 of the steering mechanism. This connecting rod is adapted to operate the wheels 29 through the arms 30 connected to their hubs in the usual manner and may be positioned at any point upon the running gear relative to the axle 4. In order to hold the arm 23 from rattling upon the pin 26 and in order to give it plenty of vertical play, the pin 26 extends considerably above the member 27 and is provided with an adjusting nut 31 at its upper end and the pin is surrounded by a light spiral spring 32 which extends between the nut and the arm so as to normally hold it upon the clamping member 27 and, at the same time, give it free movement.

The gear 21 meshes with similar gears 33 and 34 which have no connection with each other, but which are journaled between the plates 18 and 19 on opposite sides of the casing and have projecting stub shafts 35 to which are connected in any suitable manner as by the set screws 36, the shafts 37. The outer ends of these shafts are connected to the transmitting shafts 38 by means of universal joints 39. The transmitting shafts comprise separate members 40 and 41, the latter of which is in the form of a tube adapted to receive the member 40 and is provided with a longitudinal slot 42 adapted to receive a lateral stud or key 43 upon the end of the member 40. This stud, while preventing relative rotation between the members 40 and 41 permits relative movement between the parts. The free ends of the members 40 are connected to short shafts 44 by means of universal joints 45 and the opposite ends of the shafts 44 are provided with yoke members 46 which carry split clamping rings 47 adapted to be clamped onto the lower end of the lamp sockets 7 by means of the clamping bolts 48.

In cases where the fly wheel of the engine is in the way, the form of connection between the steering gear and the lamp socket is as shown in Figs. 6 to 9, wherein a casing composed of a pair of angular plates 49 and 50 is shown, in which are journaled the gears 51 and 52, the former being operated by the hinged arm 23 and the latter being connected by the universal joints and sliding transmission shafts 41 to the lamp sockets. In these figures the casings are shown arranged to either side of the springs 5 and the connecting rod 28 of the steering mechanism is shown arranged in front of the axle instead of behind the same. This type of steering is shown in the Packard and many other cars at present on the market and for this reason the device has been adapted to both types. The operating arm 23 is removably connected to the stud 22 and therefore may be reversed so as to be connected to either a front or a rear connecting rod.

In both forms illustrated in this application, the driven gears are somewhat smaller than the driving gears so that the angle of throw of the wheels is increased a given percentage in the lights. In other words, if the wheels are thrown to the left 35° the lamps will be turned 45° or thereabout while when the wheels are straight with the vehicle the lamps will also be straight. This ratio may be increased or decreased by increasing or decreasing the number of teeth upon the driven gears. The universal joints and the sliding transmission shafts permit any reasonable amount of movement between the chassis and the axle, and the hinged operating arm 23 together with the spiral spring 32 upon the pin 26 permits considerable relative movement between the axle and the connecting rod which is caused by vibration or otherwise, without in any way damaging or interfering with the action of the parts.

Referring more particularly to Figs. 11 to 15 the casings 14 are secured directly beneath the plates 6. These casings are bolted to the axle outside of the springs 5 and are circular in outline having in one side thereof, a slot 53 to permit the passage of the operating arm 54 whose inner end is integrally connected with a circular ring 55 which fits the internal periphery of the casing and is provided with internal gear teeth 56 adapted to engage the external gear teeth 57 upon the gear 58 which is journaled upon the stub shaft 59 eccentrically mounted with respect to the gear ring 55. The gear 58 is somewhat smaller than the gear ring 55 so that its ratio of movement is approximately twenty per cent. greater than said gear ring. The arm 54 is provided with an elongated slot 60 in its rear and adapted to be engaged by an operating pin 61 carried upon the steering rod 62 and is hinged in its center as at 63 to permit relative movement between its parts and thereby accommodate any relative movement between the axle and the steering rod. The pin 61 is extended up some distance from the steering rod and is provided with an adjusting nut 64 and a spiral spring 65 surrounds the pin between the nut and the arm 54, so as to hold the latter upon the top of the steering rod and at the same time permit free movement thereof without rattling. The stub shaft 59 projects through the top of the casing 14 for a short distance where it has connected to it, through the universal joint 66, a telescoping shaft 67 whose opposite end is connected to a yoke shaft 68 by means of a universal joint 69. This yoke shaft is connected directly to the end of the lamp sockets by a clamping band 70.

Having thus described the invention, what is claimed is—

1. The combination with a vehicle having steering wheels, of a steering mechanism for operating said wheels, a lamp, a connection between the lamp and the steering mechanism, said connection including a differential gear and a telescoping transmission shaft whereby the lamp is turned in the same direction with, but at a greater angle than the wheels.

2. The combination with a vehicle, having steering wheels, of steering mechanism therefor including a wheel connecting rod, and a yielding connection between the steering rod and the head light which includes a differential gear and a transmission shaft, said connection adapted to turn the head light a greater distance than the movement of the wheels in the same direction.

3. The combination with a vehicle, having steering wheels, of steering mechanism therefor including a wheel connecting rod, a pair of lights mounted upon the vehicle, a differential driving gear mounted upon the axle of the vehicle, a yielding connection between said gear and the connecting rod, and yielding connections between the gear and said lamps whereby the lamps are turned in the same direction with the wheels but at a greater angle.

4. The combination with a vehicle having steering wheels, of a steering rod therefor, a pair of head lights carried by the vehicle, a driving gear mounted on the axle of the vehicle, an adjustable operating arm for said gear connected to the steering rod, driven gears smaller than the driving gear, and operating connections between the driven gears and the lights.

5. The combination with a vehicle having steering wheels, of a steering mechanism therefor, a pair of head lights journaled on the vehicle, a driving gear mounted upon the axle, an operating arm for said gear connected to the steering rod, driven gears smaller than the driving gear and meshing therewith independent of each other, and a telescoping shaft between each driven gear and the lights.

6. The combination with a vehicle having steering wheels, of a steering rod therefor, a head light journaled on the vehicle, a driving gear mounted on the axle of the vehicle, an operating arm for said gear, a sliding connection between the operating arm and the steering rod, a driven gear smaller than the driving gear and in mesh therewith, and a yielding and telescoping shaft connecting the driven gear with the light.

7. In combination, a vehicle having steering wheels, a steering rod therefor, a lamp mounted on the vehicle, a yielding shaft connected to the lamp, a connection between the steering rod and the shaft including a gear ring, and a smaller gear arranged inside the ring.

8. The combination with a vehicle having steering wheels, of a steering rod therefor, a lamp mounted to rotate on the vehicle, a yielding shaft connected to the lamp, an operating arm connected to the steering rod, a casing mounted on the axle, a gear ring journaled in the casing and connected with said operating arm, and a pinion connected to the shaft and mounted eccentrically inside the ring and in mesh therewith.

9. The combination with a vehicle having steering wheels, of a steering rod therefor, a lamp mounted to rotate on the vehicle, a shaft connected to the lamp, a hinged operating arm adjustably connected to the steering rod, a casing mounted on the axle, a gear ring journaled in the casing and connected with said operating arm, and a pinion connected to the shaft and mounted eccentrically inside the ring and in mesh therewith.

10. The combination with a vehicle having steering devices, of means to operate said devices, a lamp carried by the vehicle, a differential gear carried by the axle, connection between the same and the steering device operating means, and a connection between the gear and lamp.

In testimony whereof I affix my signature in presence of two witnesses.

CHARLES A. MOBERG

Witnesses:
E. EDMONSTON, Jr.,
K. ALLEN.

---

Copies of this patent may be obtained for five cents each, by addressing the "Commissioner of Patents, Washington, D. C."